(No Model.) 2 Sheets—Sheet 1.

J. C. HENRY.
ELECTRIC RAILWAY SYSTEM.

No. 500,068. Patented June 20, 1893.

Witnesses
W. H. Courtland
Edward Brandt

Inventor
John C. Henry
By Knight Bros
Attys

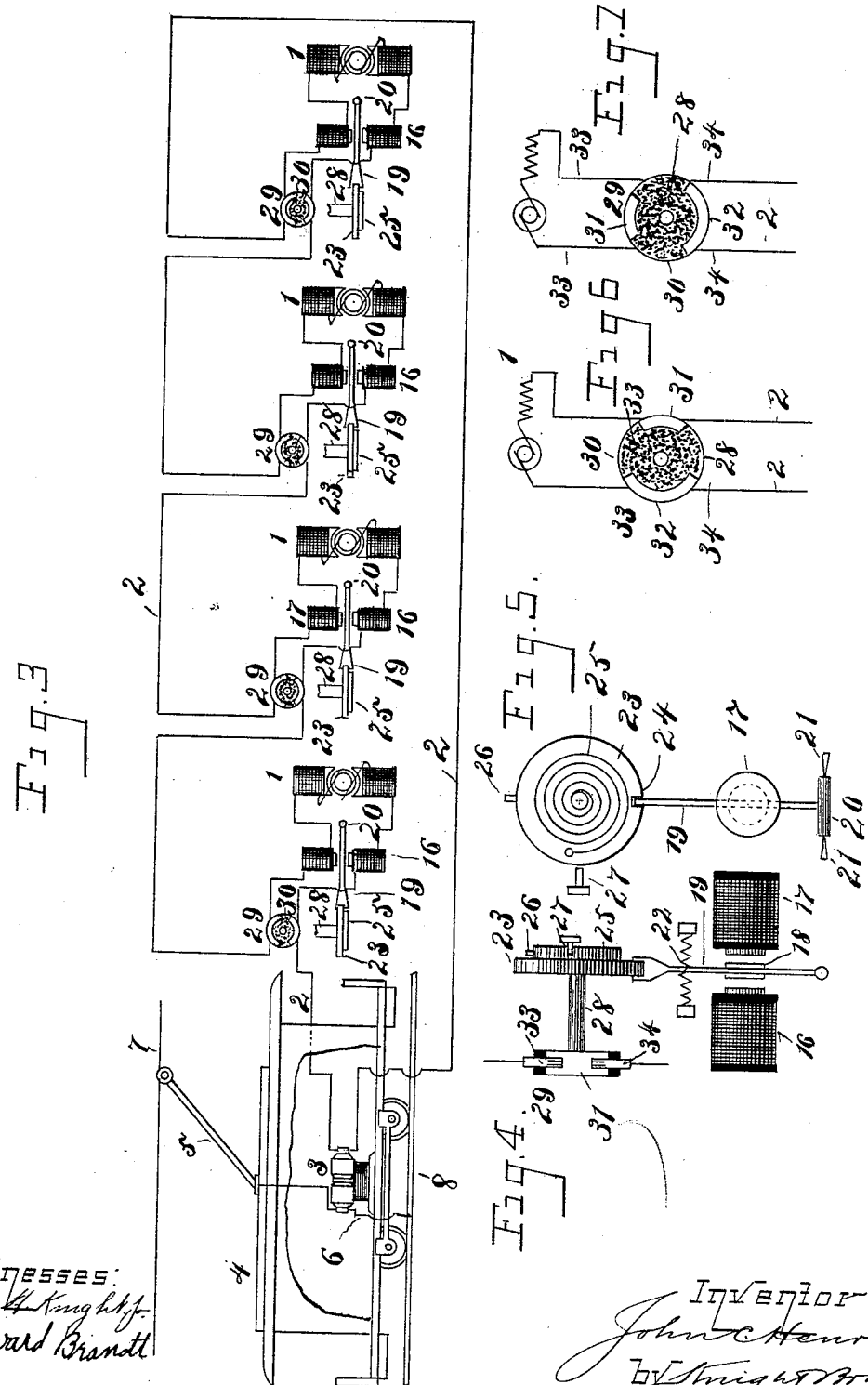

UNITED STATES PATENT OFFICE.

JOHN C. HENRY, OF NEW YORK, N. Y.

ELECTRIC-RAILWAY SYSTEM.

SPECIFICATION forming part of Letters Patent No. 500,068, dated June 20, 1893.

Application filed April 29, 1892. Serial No. 431,205. (No model.)

*To all whom it may concern:*

Be it known that I, JOHN C. HENRY, a citizen of the United States, residing in the city, county, and State of New York, have invented certain new and useful Improvements in Electric-Railway Systems, &c., of which the following is a specification.

My present improvements relate particularly to electric railways on which cars are operated in trains and have in view the division of the motive power and traction over all the cars of the train combined with the confining of the current collecting devices to a single car.

In all known railway systems whether steam, cable or electric of the present day, where trains of cars are operated, one car is employed as a motor car and trail cars are attached thereto. The motor car is of sufficient capacity to move all of the cars. Each car forms a link in the chain and its draw bars, sills, floors, &c., are required to be sufficiently heavy to stand the strain not only of its own weight but of that of all the other cars. Such provisions increase the weight of the train and present other objections. Ordinarily also, the motors in electric railway systems are in parallel circuit and require current throttling or wasting devices to regulate them. To remedy these evils and accomplish other results hereinafter more specifically pointed out are the objects of the present invention.

Figure 1:
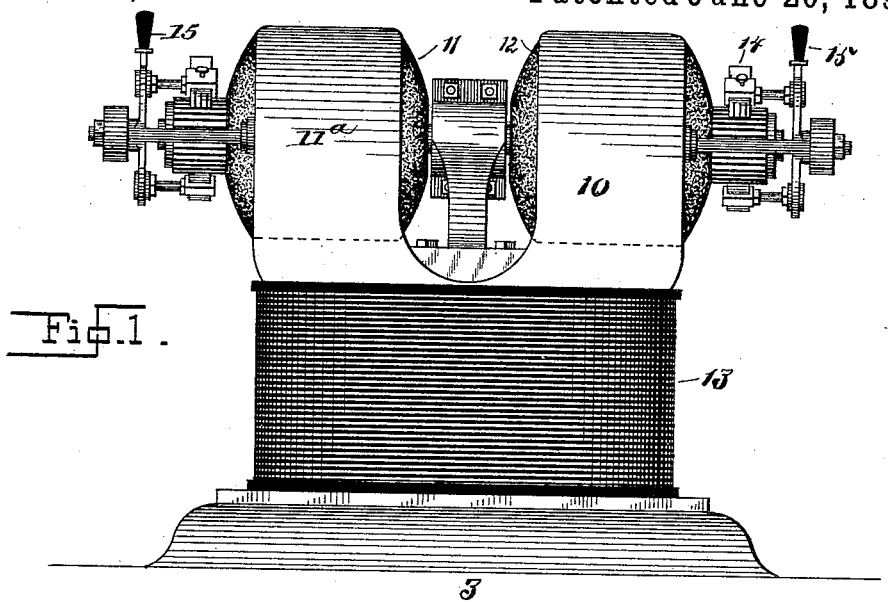
Figure 2:
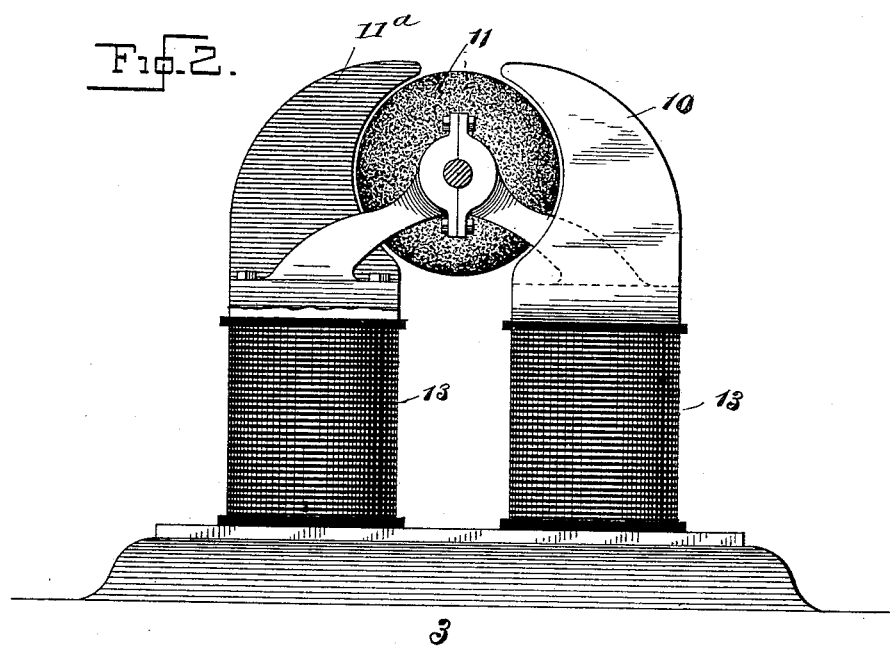

In the accompanying drawings, Figure 1 is a side elevation; and Fig. 2 an end elevation, partially in section, of the motor generator. Fig. 3 represents the railway system in diagram. Figs. 4 and 5 are detail views, taken in planes at right angles to each other, of the automatic cut-out employed. Figs. 6 and 7 are diagrammatic views in two positions of the electric connections to the switch of said cut-out.

I provide each car, or a number of cars of the train, with separate series wound motors and couple the motors up in series with a single dynamo, which may be carried by one of the motor cars, or by a pilot or trail car.

Referring to Fig. 3, 1, 1, are the series wound motors, each carried by an independent car and mechanically connected to the axles thereof, and electrically connected by conductors 2 with the generator armature 12 of a motor generator 3 on a car 4, the motor 11, 11$^a$ of which has connection, as for example by trolley pole 5, conductor 6, the overhead line 7 and rail return 8, with stationary dynamos, not shown. The design is to supply the current to a motor generator on the single car and thence supply the energy converted to the series wound motors of the separate cars. The motor of the motor generator 3 is preferably shunt wound and supplied with current of constant potential from the stationary source of electricity.

The form of motor generator preferably employed is shown in Figs. 1 and 2 and its details are fully described and claimed in my application, Serial No. 456,725, filed December 29, 1892. It will be sufficient here to point out that the motor armature 11 and generator armature 12 are excited by common field-magnets 13 whose coils are in shunt with the motor armature 11 so that the generator armature 12 is separately excited. The brushes 7 of both motor and generator commutators are adjustable by means of handles 15 which are arranged within reach of the motor man. Both the electro-motive force and the current of the circuit of motors 1 are varied at will by shifting the handle 15 of the generator. The arrangement involves a variety of features—all tending to reduce the weight of the motor-generator and, indirectly, of the whole train. They are: the operation of the motor generator at a very high speed whereby without increasing its size sufficient energy can be developed to supply a large number of car motors, the employment of a separate motor for each car, the connecting of such motors in series, and the lightening of the whole car structure rendered possible by the individual operation of every car of the train. The load is divided among all the motors of the train. The system is accordingly more efficient than one in which a direct—unconverted—current is used for the reason that the weight of the cars may be largely reduced, (fully one-half) because of the taking off of the individual cars of the strain transmitted from the other cars of the train; hence smaller and lighter motors can be used and the consumption of energy decreased. I prefer to have the motor of the motor generator shunt wound for the reason that thereby nearly a constant speed is maintained whether running loaded or empty. It is well-known that the speed of a series-wound motor fluctuates greatly and that such a motor races when without load.

As I propose to run the motor generator at a terrific velocity, in order to increase its weight efficiency, the maintenance of a uniform speed is especially important as slight increase of speed might pass the limit of safe operation of the machine, passing which limit the tangential strain might destroy the motor.

The high voltage supplied by the generator 3 is split up among the series motors and there is but a slight drop of potential between the terminals of each motor, and a consequently small liability of the burning out of the motors. A comparatively rough winding can be employed and crude workmanship may be used, resulting in the cheapening of the cost of construction.

To provide for a possible derangement of any of the motors whereby it should be desirable to cut said motor out of circuit, I provide an automatic switch and for this purpose I take advantage of the difference in the amount of current on the line on the two sides of the motor. In case of such derangement, where, for example, owing to the grounding or partial grounding of part of the wire in the motor more current enters one terminal than passes out at the other, a differential effect may be obtained, which being caused to operate a switch will cut the motor out of circuit, and in doing this I arrange to leave the connections of the motor broken, so that the motor will be electrically inert.

16, 17 are two electro-magnets, the magnet 16 being connected into the circuit of each motor on the supply or positive side and the magnet 17 connected in the circuit at the opposite or negative side of the motor. Between the two magnets is hinged or supported in vibratory or movable fashion an armature 18. It is shown carried by a stop arm 19 mounted by its bar 20 on trunnions 21 which have any desired support. Springs or other means 22 hold the armature 18 normally to a position midway between the electro-magnets.

23 is a wheel having a notch 24 to receive the arm 19 and a spring 25 so connected as to tend to rotate the wheel 23 when released by the arm 19, until a projection 26 thereon is arrested by a stop 27 which is fixed to a support at a suitable point.

The shaft 28 of wheel 23 carries an electric switch wheel 29, which has, as is shown in Figs. 6 and 7 more particularly, a body 30 of insulating material and two contact plates 31 and 32 forming part of the wheel's circumference. The opposite motor terminals are in the form of brushes 33 (see Fig. 4) and the terminals from the generator have corresponding brushes 34. The motor terminals are a greater distance apart than the width of one of the contact plates 31, and the arrangement of the switch is such that when it is turned to cut out the motor this contact plate is turned between the motor terminals, leaving such terminals both in contact with the insulating body 30 of the switch, and thus leaving the motor electrically inert. At the same time, the larger contact plate 32 is turned into contact with both of the terminals 34 connected with the generator, thus short-circuiting the motor so cut out.

The operation of the switch is as follows: If for any reason less current passes one motor terminal than the other, the greater current flowing on the magnet 16 or 17 will overcome the equilibrium of the stop arm 19, detaching it from the spring wheel 23 and so allowing the spring 25 to throw the switch wheel 29 so as to cut out the motor and at the same time complete the circuit around the same; and in the system herein described the train will, in that event, continue to be operated by the remaining motors not so cut out.

The cut-out just described is not claimed herein, being the subject of my application, Serial No. 460,003, filed January 28, 1893.

Having thus described my invention, the following is what I claim as new therein and desire to secure by Letters Patent:

1. In an electric railway system having a stationary source of electricity and line conductors connected therewith, a train of cars having on one car means for effecting traveling contact with said conductors, a high-speed motor-generator thereon, having its motor shunt-wound and individual slow-speed series wound motors on the several cars of the train, each adapted to be connected to its car's axles and all coupled in series with the generator of said motor generator substantially as set forth.

2. In an electric railway system, in combination with a source of electricity, a train having on one car a motor generator connected with said source and having its motor shunt wound, a separate series-wound motor on each car electrically connected in series with the generator armature of the motor generator, and adapted to be mechanically coupled with its car's axle, and manually operated means for varying the electro-motive force and quantity of current supplied by said generator substantially as set forth.

3. In an electric railway system having a stationary source of electricity and line conductors connected therewith, a train of cars having on one car means for effecting traveling contact with said conductors, a constant high-speed motor generator having its field magnet coils common to both motor and generator and wound in shunt with its motor armature, and a train circuit including in series the generator armature, individual series-wound motors on the cars, (each adapted to be connected mechanically to its car's axle)

and means for regulating the electro-motive force and quantity of current in said train circuit, substantially as set forth.

4. In an electric railway system, in combination with a source of electricity, a plurality of motors connected therewith and an electric cut-out for one or more of said motors, comprising an electro-magnetic switch adapted to be operated by a variation of current between the motor terminals to open and leave open the circuit of the motor, substantially as set forth.

5. In an electric railway system, the combination with a source of electricity, a plurality of motors connected therewith and an electric cut-out for one or more of said motors, comprising an electro-magnetic switch adapted to be operated by a variation of current between the motor terminals and when open to close the circuit around the motor and open and leave open the circuit of the motor, substantially as set forth.

JOHN C. HENRY.

Witnesses:
GEO. H. KNIGHT, Jr.,
M. V. BIDGOOD.